United States Patent
Sulzbach et al.

(10) Patent No.: US 6,635,200 B2
(45) Date of Patent: Oct. 21, 2003

(54) PROCESS AND DEVICE FOR PRODUCING PLASTIC MOLDINGS FROM A FLOWABLE REACTION MIXTURE

(75) Inventors: Hans-Michael Sulzbach, Königswinter (DE); Reiner Raffel, Siegburg (DE); Helmut Duschanek, Königswinter (DE)

(73) Assignee: Hennecke GmbH, Leverkusen (DE)

( * ) Notice: Subject to any disclaimer, the term of this patent is extended or adjusted under 35 U.S.C. 154(b) by 28 days.

(21) Appl. No.: 09/942,514

(22) Filed: Aug. 29, 2001

(65) Prior Publication Data

US 2002/0027306 A1 Mar. 7, 2002

(30) Foreign Application Priority Data

Sep. 5, 2000 (DE) .......................................... 100 44 013

(51) Int. Cl.[7] .............................................. B29C 45/18
(52) U.S. Cl. ...................... 264/39; 264/102; 264/328.6; 425/543; 425/562
(58) Field of Search .................... 264/328.4, 328.6, 264/39, 102; 425/543, 562

(56) References Cited

U.S. PATENT DOCUMENTS

| 3,621,892 | A | | 11/1971 | Gillespie | 141/7 |
|---|---|---|---|---|---|
| 4,275,172 | A | | 6/1981 | Barth et al. | 521/112 |
| 4,439,386 | A | | 3/1984 | Antczak | 264/102 |
| 4,898,714 | A | | 2/1990 | Urban et al. | 422/133 |
| 4,908,168 | A | * | 3/1990 | Miller et al. | 264/40.1 |
| 5,382,394 | A | * | 1/1995 | Terhardt | 264/40.7 |
| 5,586,724 | A | | 12/1996 | Allen | 239/112 |

FOREIGN PATENT DOCUMENTS

| DE | 1198531 | 8/1965 |
|---|---|---|
| DE | 8616880.0 | 11/1986 |
| EP | 1029652 | 8/2000 |
| EP | 1 033 230 | 9/2000 |
| GB | 895779 | 5/1962 |
| JP | 61-121903 | 6/1986 |
| JP | 61-258712 | 11/1986 |
| WO | 97/11824 | 4/1997 |

* cited by examiner

*Primary Examiner*—Jill L. Heitbrink
(74) *Attorney, Agent, or Firm*—Joseph C. Gil; Lyndanne M. Whalen

(57) ABSTRACT

Polyurethane molded articles are produced from a flowable polyol-polyisocyanate reaction mixture on a shot-wise basis. The flowable reaction mixture is formed by combining the components of that mixture in the mixing chamber of a mixhead. The contents of the mixhead are introduced (preferably via an outlet pipe) into a mold in a manner such that the mixing chamber is substantially emptied in each case. Any ambient gas in the mixing chamber is then removed before the respective next shot is initiated.

12 Claims, 5 Drawing Sheets

PROCESS AND DEVICE FOR PRODUCING PLASTIC MOLDINGS FROM A FLOWABLE REACTION MIXTURE

BACKGROUND OF THE INVENTION

The present invention relates to a process for producing plastic moldings from a flowable reaction mixture. In this process, a "shot" of flowable reaction mixture is produced by mixing the components of the reaction mixture in the mixing chamber of a mixhead. This shot of reaction mixture is then introduced into a mold where the reaction mixture cures, and the plastic molding is then removed from the mold. The present invention also relates to a device suitable for carrying out this process.

A rotating mold carrier in the form of a so-called rotary table or continuous belt, on which a multiplicity of molds is arranged, is generally used to produce plastic molded articles by processes such as that of the present invention. A series of mold cavities may be filled by placing one of the mold cavities to be filled under the mixhead and/or outlet pipe for an adequate period of time and then moving the mold carrier to cause the filled mold cavity to be removed from under the mixhead and an unfilled mold cavity to be placed under the mixhead and/or outlet pipe. The period of time necessary to fill a mold cavity corresponds substantially to a shot time in each case. When the mixhead is kept stationary, the movement of the mold carrier occurs in a cycle with the mixhead being docked in place for the filling of a mold.

If the mixhead is completely emptied at the end of a shot, ambient air penetrates into the mixing chamber. Because air (i.e. oxygen and nitrogen) has only imperceptibly low solubility in the plastic-forming (e.g., polyol-isocyanate) reaction mixture, the reaction mixture foams when the raw material components are introduced at the beginning of a shot. This foam formed at the beginning of each shot must be collected and discarded to avoid defects in the molding.

According to a proposal of the applicant named in EP-A 1 033 230, foam formation is prevented by providing the mixhead with a closure element and adapting the reactivity of the reaction mixture to the time interval between the end of a shot. In this disclosed process, the mixing chamber outlet is closed by the closure element between the end of the shot and the beginning of the next shot (initiated by opening the closure element) in such a way that the mixing chamber can remain filled between two shots. A process of this kind requires strict observance of the cycle times and/or interval times between the shots to avoid uneconomically long curing times.

SUMMARY OF THE INVENTION

It is an object of the present invention to provide a process for the production molded plastic articles in which foam formation at the beginning of a shot including when the mixing chamber is emptied after each shot is prevented.

It is another object of the present invention to provide a device useful for the production of molded plastic articles in which foam formation at the beginning of a shot is prevented.

These and other objects which will be apparent to those skilled in the art are accomplished by removing any ambient air from the mixing chamber before the beginning of each shot.

DETAILED DESCRIPTION OF THE PREFERRED EMBODIMENTS OF THE PRESENT INVENTION

Figure 1:
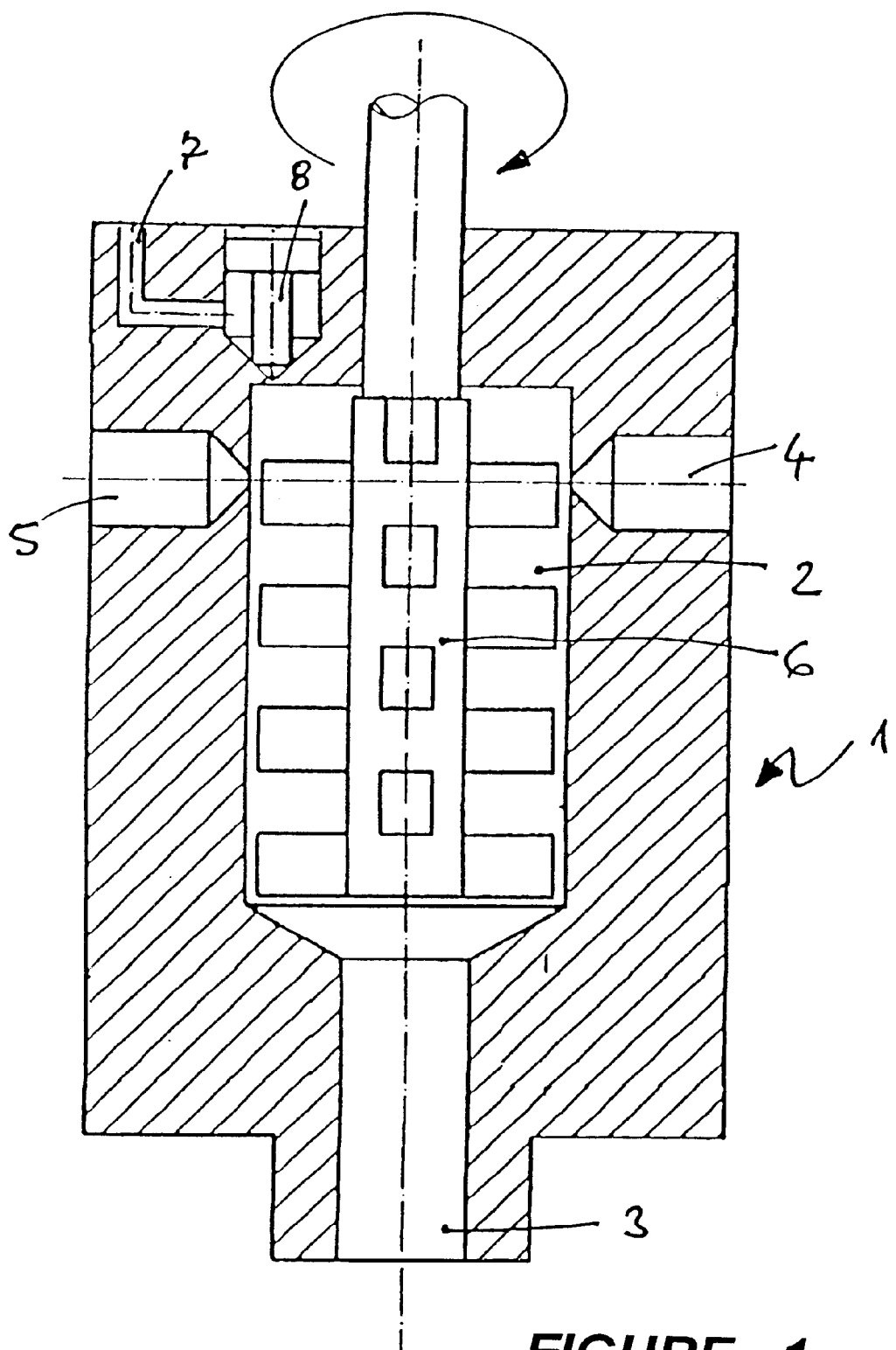
FIG. 1 illustrates an agitator mixhead suitable for carrying out the process of the present invention.

The present invention provides a process for producing polyurethane molded articles from a flowable polyol-polyisocyanate reaction mixture. In this process, the molded articles are produced shot-wise from the components which have been mixed in the mixing chamber of a mixhead to form the flowable reaction mixture are introduced, e.g. via an outlet pipe, into molds. The mixing chamber is substantially completely emptied after each shot. In this process, any ambient gases located in the mixing chamber are removed at least before the next shot is initiated.

In one embodiment of the present invention, any ambient gases present in the mixing chamber are replaced by a gas which is soluble in the reaction mixture. The gas which is soluble in the reaction mixture should preferably have a solubility and rate of dissolution such that any bubbles which may have formed initially are completely dissolved within the mold filling time. Carbon dioxide is particularly suitable as the soluble gas.

To implement the invention, it is generally sufficient to flush the mixing chamber with the soluble gas (preferably carbon dioxide) after a shot has ended, the mixing chamber has been emptied and the mixing head un-docked from the mold, so that the ambient air is flushed out of the mixing chamber.

The intensity and duration of the flushing process are preferably controlled in such a way that the air partial pressure (sum of the partial pressures of oxygen and nitrogen) in the mixing chamber is less than 50 mbars, preferably less than 10 mbars, most preferably less than 3 mbars.

In a preferred embodiment of the invention, the mixhead has a closure element located at its outlet end. This closure element is preferably in the form of a slide arranged transverse to the outlet opening.

The slide may be arranged directly on the outlet of the mixhead or, if an outlet pipe is provided downstream of the mixhead, on the outlet pipe at a point beneath the mixhead outlet. Preferably, the closure element for the mixing chamber is arranged as far downstream of the direct mixing chamber outlet as the geometry of mixing head, outlet pipe and docking point with respect to the mold allow.

The provision of a closure element makes it possible to accelerate the flushing process. When the closure element is closed, the ambient air which has penetrated into the mixhead is initially extracted and the soluble gas is then introduced.

In another embodiment of the invention, where a mixhead having a closure element is employed, ambient air located in the mixhead is replaced by a vacuum. A valve-controlled vacuum connection is provided in the mixing chamber wall for this purpose. The vacuum connection may lead to a vacuum pump which is used to evacuate ambient air from the mixing chamber. Preferably, a vacuum container which is connected to the vacuum valve of the mixing chamber via a vacuum line is provided. The maintenance of the vacuum in the vacuum container can be ensured by a vacuum pump operated continuously or periodically.

To implement the process of the present invention, before shot commencement, the closure element of the mixing chamber is closed, the mixing chamber is evacuated, and the valves for introducing the components of the reaction mixture into the mixing chamber are opened. The closure element is opened at the moment at which the mixing chamber is filled with reaction mixture.

The various successive steps of the process of the present invention may be controlled by electronic actuation of corresponding electrical or pneumatic control elements.

The particulars of the invention set out above apply to all mixer types used in polyurethane technology for mixing polyol and isocyanate components.

The invention is particularly simple to implement with mixheads in which the mixing chamber volume can be reduced to zero by corresponding devices. Specific examples of such mixheads include counterflow high pressure injection mixers with ejector rod and friction mixers. In such mixers, a closure element for the mixing chamber outlet is provided. Before shot commencement, the closure element is closed, the mixing chamber volume reduced to zero, the mixing chamber working volume is created by generating a vacuum, and the components of the reaction mixture are introduced while the mixing chamber outlet is sill closed. The closure element is opened at the moment at which the mixing chamber is filled.

The invention will be explained in greater detail below with the aid of FIGS. 1 through 5.

FIG. 1 shows in cross-section a mixhead 1 (agitator-type) with a mixing chamber 2, an outlet pipe 3, introduction elements 4 and 5 for the polyol and isocyanate component (preferably valve-controlled) and the agitator 6. According to the invention, valve 8 controls gas introduction through gas inlet 7 through which the soluble gas, preferably carbon dioxide, can be introduced into the mixing chamber 2.

In accordance with the present invention, before shot commencement and with component introduction elements 4 and 5 closed, carbon dioxide is introduced into the mixing chamber 2 via inlet 7 and valve 8 and any ambient gases located in the mixing chamber 2 are flushed out of the mixing chamber. This can take place by automatic control during mold changing without any loss of time. After ambient air has been sufficiently removed, the shot may be initiated, e.g., by operating valves for component introduction elements 4 and 5.

Figure 2:
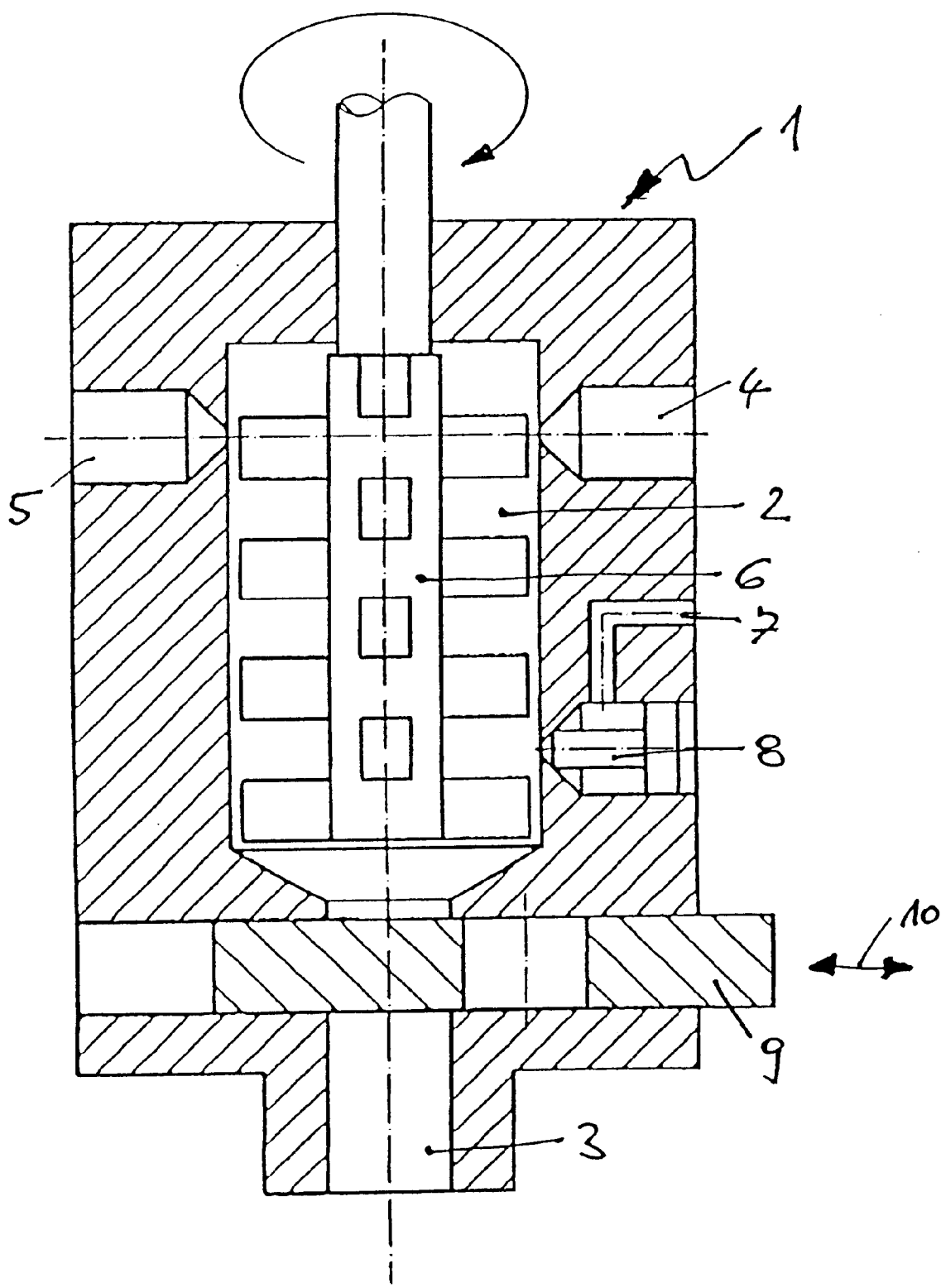
FIG. 2 illustrates another agitator mixhead suitable for carrying out the process of the present invention.

FIG. 2 illustrates a mixhead I (agitator type) similar to that shown in FIG. 1. The reference numerals of FIG. 2 denote the same components as they do in FIG. 1. In the mixhead I illustrated in FIG. 2, a closure element, formed as slide 9, for the mixing chamber 2 is additionally provided. The slide 9 can be moved in the direction of the double arrow 10. The closure position of the slide 9 which is shown is set prior to shot commencement. The mixing chamber 2 is then evacuated via inlet 7 and valve 8. After a pressure in the mixing chamber 2 of preferably less than 50 mbars, more preferably less than 10 mbars, most preferably less than 3 mbars, has been reached, the valves for the component inlet elements 4 and 5 are opened and slide 9 is opened by sliding it to the left at the moment at which the mixing chamber is filled with the reaction mixture.

The mixhead illustrated in FIG. 2 may also be operated in accordance with the present invention in such a way that carbon dioxide is initially introduced into the mixing chamber 2 via inlet 7 after evacuation of the mixing chamber 2.

Figure 3:
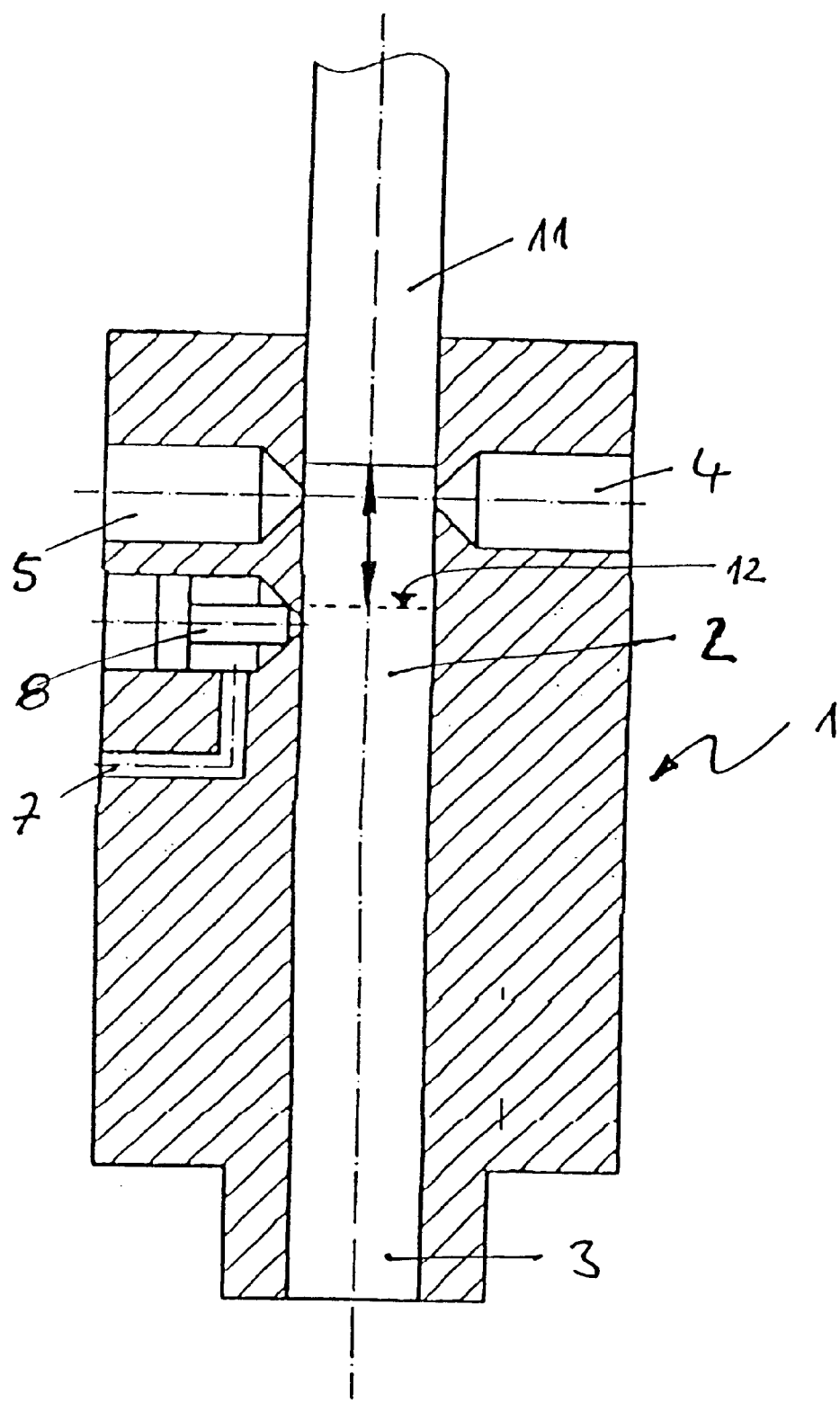
FIG. 3 illustrates a high pressure injection mixhead suitable for carrying out the process of the present invention.

FIG. 3 is a cross-sectional diagram of a mixhead 1 (high pressure injection type) which operates in a manner comparable to that of the mixhead illustrated in FIG. 1.

The high pressure injection mixhead illustrated in FIG. 3 includes a cylindrical mixing chamber 2, the adjoining outlet pipe 3 as well as the component inlet elements 4 and 5 (injection nozzles) through which the components are nozzle-injected at a pressure of typically more than 100 bars. An ejector rod 11, which can be hydraulically moved along the axis of the mixing chamber 2 as far as the outlet opening of the outlet pipe 3 to eject remaining quantities of the reaction mixture at the end of a shot, is also provided. Inlet 7 through which introduction of gas soluble in the reaction mixture is provided is controlled by valve 8. Before shot commencement, the atmosphere in mixing chamber 2 and outlet pipe 3 can be replaced by carbon dioxide. Preferably, during the displacement of the ambient air out of the mixing chamber 2, the ejector rod 11 is moved up to level 12 just above the inlet for the carbon dioxide.

Figure 4:
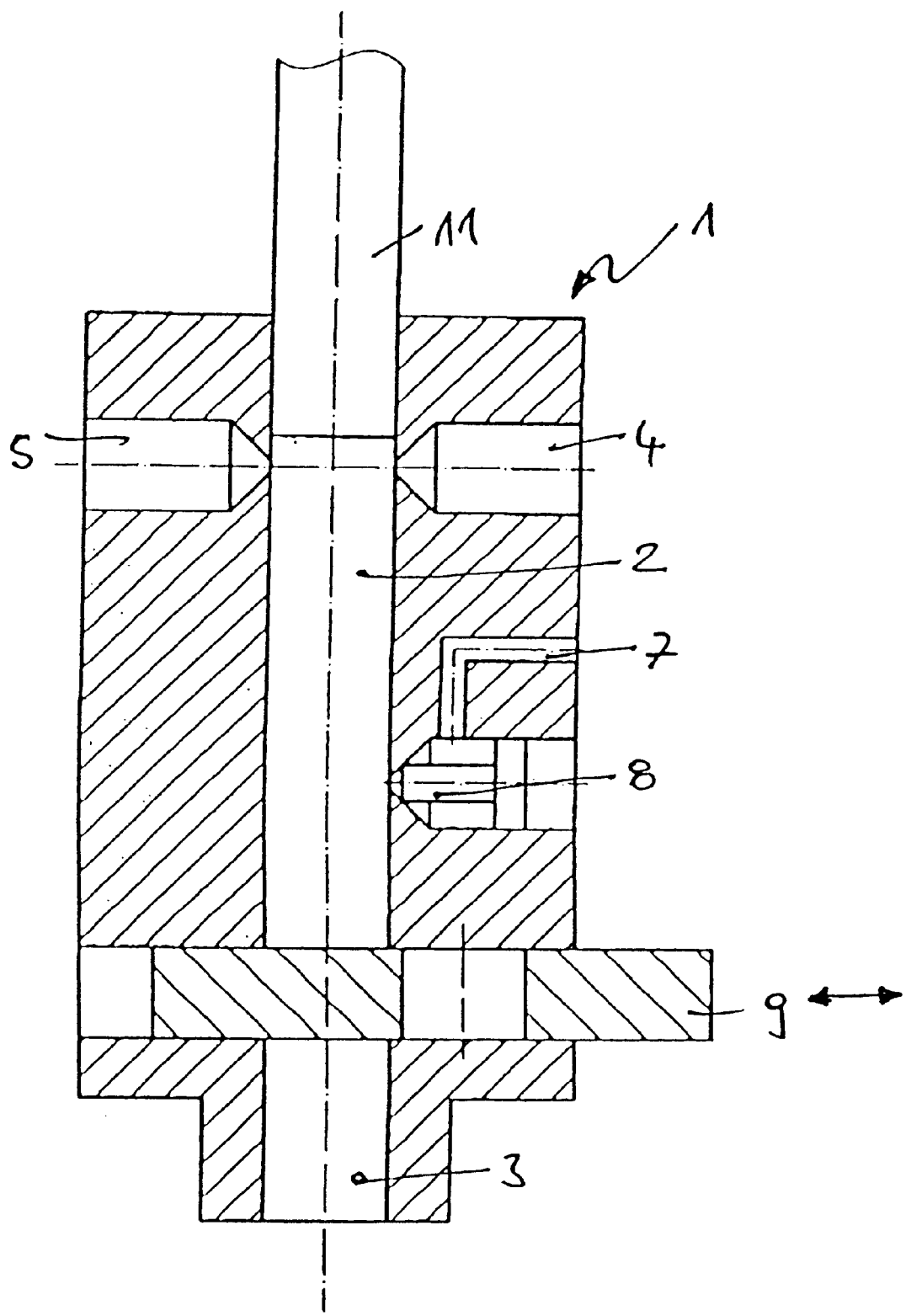
FIG. 4 illustrates another high pressure mixhead suitable for carrying out the process of the present invention.

FIG. 4 illustrates a mixhead I (high pressure injection type) which operates in a manner similar to that of the mixhead illustrated in FIG. 2. In this embodiment of the invention, the high pressure injection mixhead has a closure slide 9 so that the mixing chamber 2 can be evacuated via gas inlet 7 controlled by valve 8 to generate a vacuum.

In an alternative mode of operation, prior to shot commencement and while closure slide 9 is open, the ejector rod 11 is moved up to the upper edge of the closure slide 9, displacing the air from the mixing chamber 2. The closure slide 9 is then closed and the ejector rod 11 is returned to the working position (as shown), the high pressure injection valves (introduction elements 4 and 5) are opened, and the closure slide 9 is opened after the mixing chamber 2 has been filled.

In another mode for carrying out the process of the present invention, carbon dioxide may be introduced into the evacuated mixing chamber 2 via a valve-controlled carbon dioxide gas line.

Figure 5:
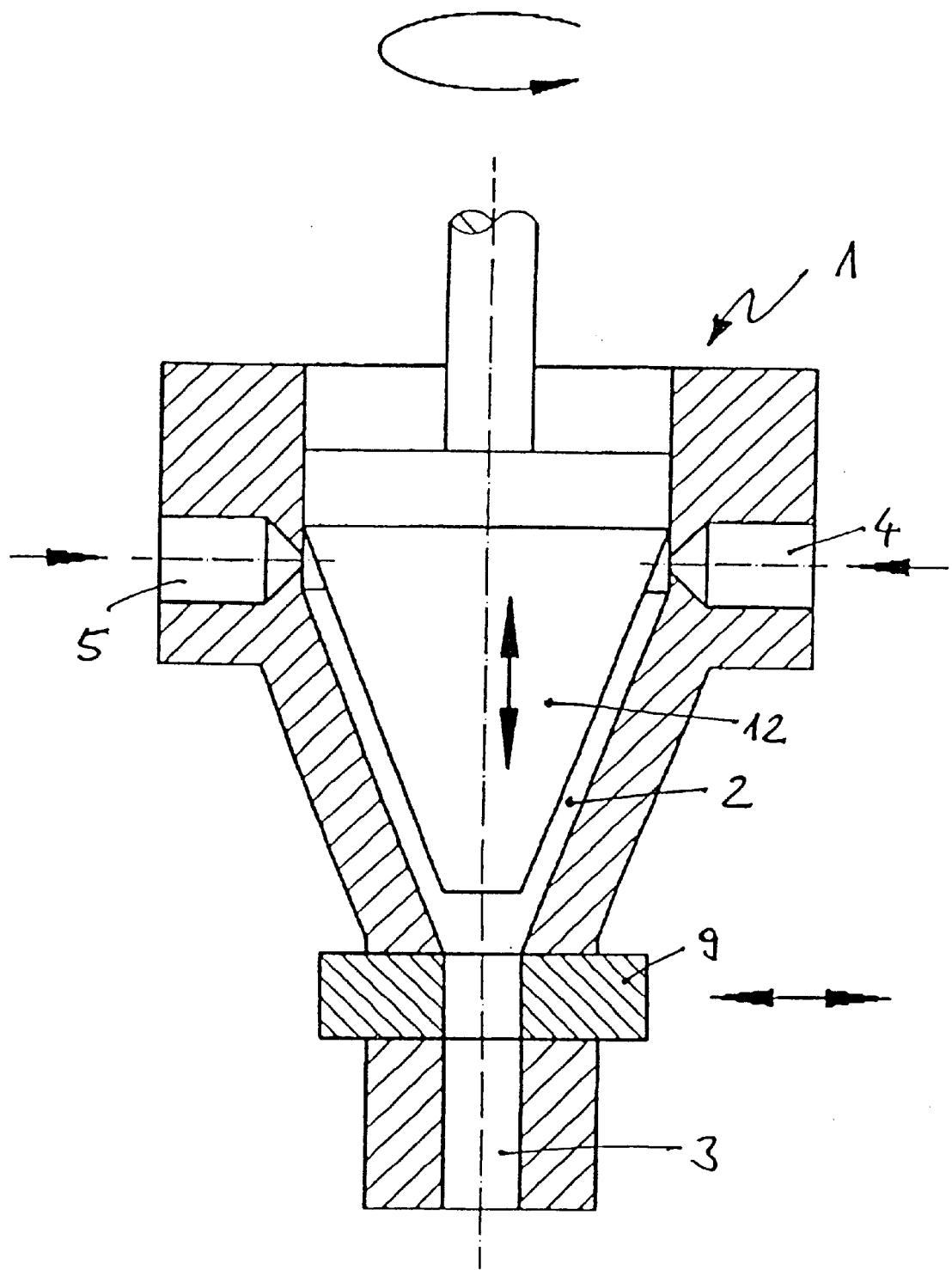
FIG. 5 illustrates a friction mixhead suitable for carrying out the process of the present invention.

FIG. 5 illustrates a mixhead 1 (friction type) with a mixing chamber 2, which is formed by an external conical mixing chamber wall and a rotor 12 complementary thereto. The reaction components are nozzle-injected into the mixing chamber at the base of the cone via nozzles (introduction elements 4 and 5) and mixed by the friction between the mixing chamber housing and the rotor 12, which typically rotates at a speed on the order of magnitude of 10,000 rpm. At the end of a shot, the rotor 12 may be axially moved in such a way that any remaining reaction mixture is displaced and the mixing chamber volume is reduced to zero. In accordance with the present invention, a closure slide 9 is provided at the outlet of the mixing chamber 2. Prior to shot commencement, the rotor 12 is moved against the external mixing chamber wall thereby displacing the ambient air, the closure slide 9 is brought into the closed position, an evacuated mixing chamber 2 is created, the rotor 12 is moved into the working position and set in rotation. The shot is initiated by opening the injection nozzles (introduction elements 4 and 5) and opening the closure slide 9.

In the case of the friction mixhead, it is, of course, also possible to introduce carbon dioxide gas into the mixing chamber or to omit the closure slide and flush the mixing chamber with carbon dioxide gas only.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a molded polyurethane article from a flowable polyol-polyisocyanate reaction mixture present in a mixing chamber comprising
   a) introducing the flowable reaction mixture into a mold in a manner such that the mixing chamber is substantially emptied,
   b) removing any ambient gas present in the mixing chamber after step a) has been completed but before step a) is repeated, and
   c) replacing the ambient gas removed in step b) with a gas that is soluble in the flowable reaction mixture.

2. The process of claim 1 in which a closure element located at the outlet end of the mixing chamber is closed before step a) and is opened only at the moment at which the mixing chamber is filled with the flowable reaction mixture.

3. The process of claim 1 in which carbon dioxide is used as the soluble gas.

4. The process of claim 1 in which the mixing chamber is flushed with a gas that is soluble in the flowable reaction mixture before step a).

5. The process of claim 1 in which the vacuum is generated by connecting the mixing chamber to a vacuum container and/or a vacuum pump.

6. The process of claim 2 in which the mixing chamber is a counterflow high pressure mixing chamber with an ejector rod arranged in the mixing chamber, the ejector rod is moved up as far as the closure element prior to step a) and a vacuum is generated by retracting the ejector rod with the closure element closed.

7. The process of claim 1 in which the mixing chamber tapers conically in the direction of flow of the reaction mixture and has a correspondingly conical rotor movable in an axial direction.

8. The process of claim 7 in which the conical rotor is moved axially before step a) in a manner such that the mixing chamber volume is approximately zero, a closure element located at the outlet of the mixing chamber is closed, and the rotor is returned to the working position to create the vacuum.

9. A device useful the production of a molded polyurethane article by a shot process comprising:
   a) a mixhead having a mixing chamber with an inlet and outlet opening present therein,
   b) means for introducing reaction mixture components into the mixhead,
   c) means for conveying any content of the mixing chamber into a mold,
   d) a mold for receiving the contents of the mixing chamber,
   e) a gas outlet for the removal of ambient gas present in the mixhead after substantially all reaction mixture has been removed from the mixing chamber; and
   f) means for introducing gas into the mixhead after removal of the ambient gas.

10. The device of claim 9 in which the means for conveying the contents of the mixing chamber to the mold is an outlet pipe.

11. The device of claim 9 in which the means for introducing reaction mixture components into the mixing chamber is an injection nozzle.

12. The device of claim 9 in which a closure element is present at the outlet of the mixing chamber.

* * * * *